United States Patent [19]

Norlin

[11] 3,901,543
[45] Aug. 26, 1975

[54] VEHICLE BUMPER ASSEMBLY

[75] Inventor: Stig Ivar Norlin, Trollhattan, Sweden

[73] Assignee: Saab-Scania Aktiebolag, Linkoping, Sweden

[22] Filed: Apr. 20, 1971

[21] Appl. No.: 135,686

[30] Foreign Application Priority Data
Apr. 20, 1970 Sweden............................ 5441/70

[52] U.S. Cl................................. 293/71 R; 293/88
[51] Int. Cl. ........................................... B60r 21/14
[58] Field of Search ............ 293/70, 71 R, 71 P, 98, 293/88; 114/219; 61/48

[56] References Cited
UNITED STATES PATENTS
| | | | |
|---|---|---|---|
| 1,195,857 | 8/1916 | Royston............................ | 293/71 P |
| 1,602,922 | 10/1926 | Midboe............................ | 293/71 R |
| 2,788,998 | 4/1957 | Wilfert............................. | 293/70 |

Primary Examiner—Frank E. Werner
Assistant Examiner—Lawrence J. Oresky
Attorney, Agent, or Firm—Cushman, Darby & Cushman

[57] ABSTRACT

The present invention relates to vehicle bumper assemblies of the type which includes at least one profiled, preferably U-shaped beam or the like adapted to be securely mounted to the frame and/or the body of the vehicle in a manner whereby the outer contours of the bumper are located outside the vehicle body or part thereof and are active in a shock absorbing capacity. Such an envisaged assembly is provided with a number of shock absorbing insert members arranged to bear against the web of the beam structure and to extend externally of the beam profile to an extent which is at least one fourth of its total height. It is basically characterized in that the beam is provided with a plurality of stays or plates which extend transversely between the longitudinally extending limb portions of said beam and which divide the beam into pocket-like sections in which the inserts are individually mountably arranged. The inserts preferably comprise cellular blocks and consist of a number of tubes of a semi-elastic or plastic material. A protective casing surrounding the beam and the inserts has an open longitudinally extending groove arranged in its rear side. This permits the casing to be stretched when mounted in position.

4 Claims, 3 Drawing Figures

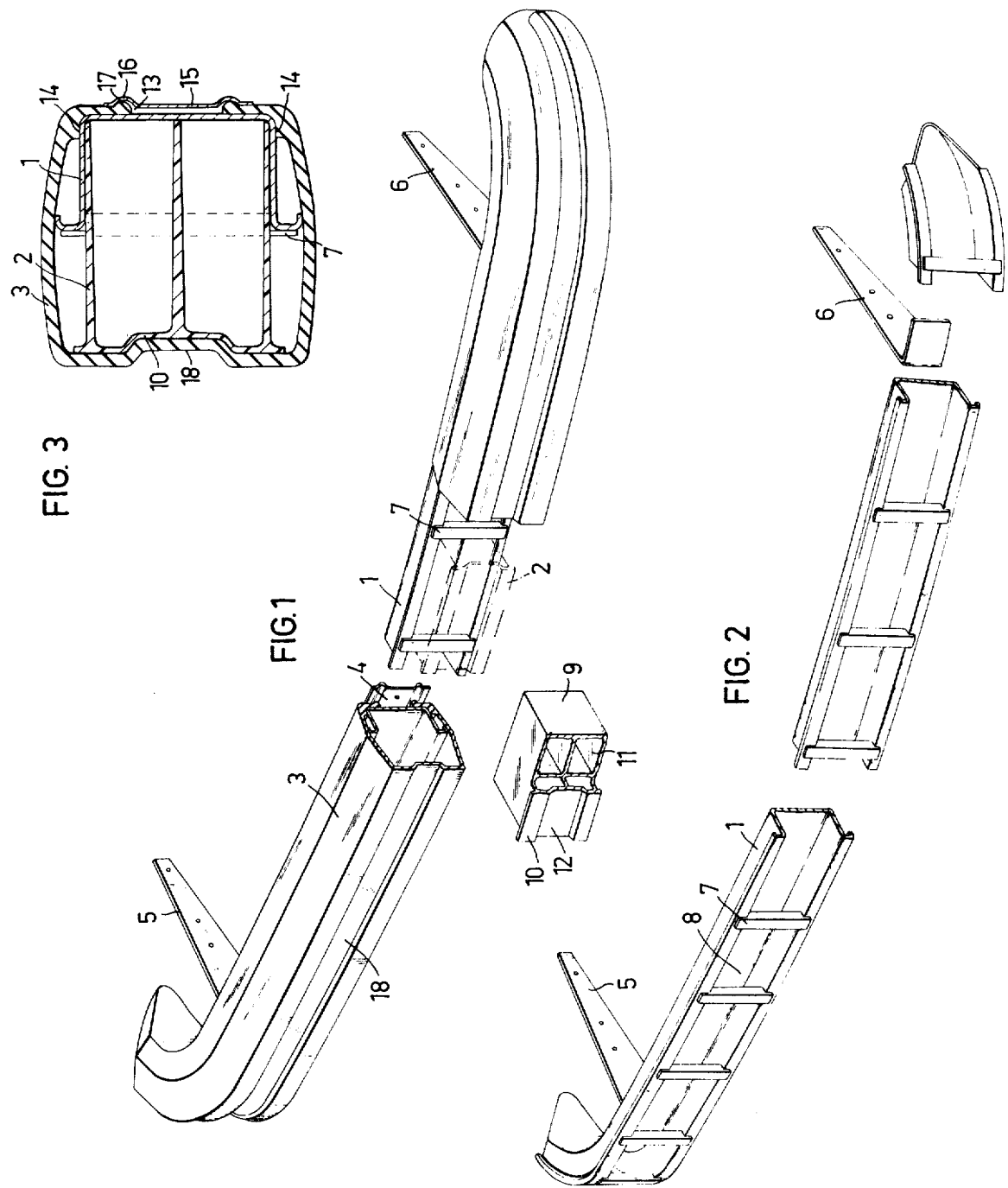

VEHICLE BUMPER ASSEMBLY

The present invention relates to a vehicle fender or bumper assemblies of the type which include at least one profiled, preferably U-shaped beam or the like adapted to be securely mounted to the frame and/or body of the vehicle in a manner whereby the outer contours of the bumper are located outside the vehicle body or part thereof and are active in a shock absorbing capacity. The bumper assembly of the type envisaged is also provided in a known manner with a number of shock absorbing insert members arranged to bear against the web of the beam structure and to extend externally of the beam profile to an extent which is at least one fourth of its total height. The original purpose of a fender or bumper assembly was to absorb and dampen stresses resulting from impact sustained by a vehicle in its direction of movement. Although this purpose still remains, it has been superseded by the desire to make such assemblies esthetically attractive which has greatly influenced the design of bumper assemblies and the manner in which they are mounted to the vehicle. In this respect, it is common practice to give the bumpers the structure of a horizontal beam which extends across the front and back of the vehicle body and the cross section of which is adapted to resist shocks, and to mount the bumper to the frame and/or body of the vehicle by means of rigid attachments. The desire for an esthetically attractive bumper has resulted in a large number of bumpers provided with an ostentatious and highly polished surface, which as a result of the inelastic construction of the bumpers and the manner in which they are mounted to the vehicle is readily damaged upon the slightest impact.

For the purpose of circumventing this disadvantage, it is known to cover the external contours of the bumper with buffer-like protecting strips of an elastic, shock-absorbing material. The damping effect afforded by these protecting strips is naturally dependent on the thickness of the strip, but, within the framework of the aforementioned esthetic requirements, the main purpose of the protecting strips is restricted to protect the metal surface of the bumper against otherwise normal surface damage.

It is also known to improve the damping effect of the bumper by mounting the bumper assembly to the vehicle by means of resilient attachment devices. The damping effect provided by such devices is restricted, however, and is easily exceeded, whereas, with the case of rigid attachment means, the impact energy is transmitted via the bumper ties or braces to the frame and/or body of the vehicle causing considerable damage and subsequent expensive repair work.

In view of this, vehicle bumper assemblies have been developed which resiliently dampen the forces acting thereon and substantially reduce the transmission of energy to the vehicle body. Bumper assemblies of this type are constructed according to a number of different basic principles. One such assembly comprises a container filled with a pneumatic or hydraulic medium. When such an assembly is subjected to impact forces and is depressed locally, the pressure within the container increases whereupon pressure regulated openings permit the medium to flow from the container to the surroundings or to an inner chamber communicating with the container.

A different bumper assembly is one which includes a core or rubber elastic material which can be compressed to a limited extent while absorbing deformation forces. With one embodiment of a bumper of this construction, a shell made of thin plate material or a rubber elastic material is arranged around the core. With a third basic construction principle, the bumper is provided with a flexible shell which is deformed when pressed in and actuates a number of axially movable shafts connected to its inner surface. Each of the shafts is mounted in an individual elastically deformable bushing and is provided with a circular, outwardly widening portion which, when the shell is pressed in, is caused to be moved into respective bushings.

The present invention relates to an embodiment of an elastic bumper for vehicles which differs from the aforementioned basic principles and which is mainly characterized in that the beam is provided with a number of ties or plates extending transversely of the longitudinally extending side limbs of the beam and dividing the beam into pocket-like sections in which inserts are arranged, the inserts preferably comprising cellular blocks and consisting of a number of tubes of semi-elastic or plastic material, and that a protective housing surrounding the beam and the inserts is provided with an open longitudinally extending groove in its rear side which permits it to be stretched when being mounted.

The special design of the bumper constructed in accordance with the present invention provides advantages which are not manifest with previously known bumper constructions. The invention enables a bumper to be constructed of simple, exchangeable components by means of which the beam securely attached to the vehicle can obtain a simple and robust construction without the requirement of a highly polished finish. The simple construction of the bumper and the manner in which it is mounted to the vehicle enables minor damage to the bumper to be easily repaired without the assistance of workshop personnel.

The damping effect afforded by the bumper of the present invention is greater than the damping effect obtained with known constructions, since when depressed the bumper according to the invention provides for an increased elastic compression length during successive increase in the resistance force and also permits room for subsequent plastic deformation of the bumper components. In this respect, the bumper is provided with a large cavity inside its protective casing, which cavity is obtained with the embodiment of the present invention by constructing the shock absorbing inserts in the form of cellular blocks having tubular cells.

An embodiment of a bumper assembly constructed in accordance with the invention will now be described with reference to the accompanying drawing, in which FIG. 1 illustrates in perspective the construction of the bumper, FIG. 2 illustrates in perspective the construction of the bumper beam and FIG. 3 is a cross section view of the bumper together with the main components thereof.

The bumper illustrated in FIG. 1 consists mainly of a beam 1, a number of shock absorbing inserts 2, a protective casing 3 and a locking bar 4. The beam 1 is made of compression-moulded sheet metal and preferably has a U-shaped cross section with respective limb members doubly folded to obtain increased rigidity. The beam 1 illustrated in FIG. 2 is arranged to be mounted horizontally to the front of a vehicle by means of two ties 5, 6 which are welded to the rear side of the beam 1.

The beam 1 is intended to lie outside the forward portion of the vehicle body and to protect said portion against shock and impact. The two ends of the fender beam 1 are curved to follow the contours of the vehicle body at the points where the forward portion of the vehicle merges with respective side portions thereof.

Securely attached between the respective limb portions of the U-shaped beam 1 is a number of transversely extending ties 7, which divide the beam 1 into pocket-like sections 8. In each of the pockets 8 is mounted a respective impact absorbing insert 2, the inserts lying against the inside of the web of the beam 1 and extending outside the beam profile through a distance which is at least one fourth of its total height. The inserts 2 are in the form of a cellular block having a rectangular frame 9 for a unit which is either composed of a number of tubes or is moulded to present a number of tubular passages.

With the embodiment of a moulded insert 2 illustrated in FIG. 1 having a common bottom plate 10 the rectangular frame 9 includes six rectangular cells 11 which are divided by partitions extending from the bottom plate 10. The cells 11 are open at the ends remote from the bottom plate 10.

As with the embodiment of FIG. 1, the free edge surface of the bottom plate 10 may be provided with a bottom groove 12 which serves as a guide groove, although alternatively the free edge surface of the plate may be flat in accordance with the embodiment illustrated in FIG. 3.

With the illustrated embodiment, the inserts 2 are made of polyethylene, although they can equally as well be made of another semi-elastic or plastic material. The protective casing 3 gives the bumper of the invention a configuration similar to conventional bumpers, although the differences between conventional bumper assemblies and the assembly of the invention are in other respects considerable. The protective casing 3 has a substantially square, ring-shaped cross section with an open, longitudinally extending groove 13 arranged in its rear side and, with the illustrated embodiment, is manufactured of a urethane plastics material with a rubber-like hardness. The shape and elasticity of the protective casing 3 enables the same to be mounted in position in a simple manner, by stretching the casing so that it engages the beam 1 along the whole of its length, thereby to enclose the inserts 2 with respective bottom plates 10 abutting the inner, forward side of the casing 3. In accordance with the embodiment illustrated in FIG. 3, the sides of the protective casing 3 gripping around the beam 1 are provided with internal, position-determining abutments 14 and the sides of the casing are arranged to engage the double folded limb portions of the beam 1, to obtain support when mounted in position.

The protective casing 3 is secured in position by a locking bar 15 which is arranged to be secured to and behind the beam 1 by a number of screws (not shown).

Two longitudinally extending recesses 16 in the locking bar 15 are arranged to engage and clamp corresponding protrusions 17 on the protective casing 3 to the beam 1, the protrusions 17 being formed on each edge surface of the longitudinally extending rear opening 13 in the protective casing 3.

In the illustrated embodiments the protective casing 3 is provided with a longitudinally extending bottom groove 18 on the front side thereof, in which groove a decorative strip (not shown) can be mounted to advantage.

The bumper assembly of the invention is not restricted to the illustrated embodiments thereof, but can be used within the scope of the following claims as an impact absorbing means for vehicles whereever it is desired to apply such means, wherewith the beam 1 forming part of the bumper assembly may be in the form of a strip or the like forming part of a larger fixed unit.

Moreover, the inserts 2 may have an alternative design. Although the aforedescribed constructional design of the cellular block is to be preferred, it does not constitute the only conceivable solution to the problem of obtaining increased effect in accordance with the invention. The following claims also embrace a bumper assembly according to the invention when the bumper is mounted in position on the vehicle.

What is claimed is:

1. A vehicle bumper including at least one profiled, preferably U-shaped beam or the like intended to be securely mounted to the frame and/or body of the vehicle, and a number of shock absorbing inserts arranged to abut the web of the beam and to extend outside the profile of the beam to a distance of at least one fourth the total height of the beam, characterized in that the beam is provided with a number of stays or plates which extend transversely between the longitudinally extending limb portions of the beam and which divide the beam into pocket-like sections in which the inserts are individually mountably arranged; that the inserts preferably comprise cellular blocks and consist of a number of tubes of a semi-elastic or plastic material, and that a protective casing surrounding the beam and the inserts has an open longitudinally extending groove arranged in its rear side which permits the casing to be stretched when being mounted in position.

2. A bumper according to claim 1, characterized in that one individual insert consists of a unit composed of a number of tubes and having a common bottom plate and tubular cells extending from said bottom plate.

3. A bumper according to claim 2, characterized in that an individual insert has a square cross section which completely fills a section space in the beam.

4. A bumper according to claim 1, characterized in that the protective casing has a substantially square, ring-shaped cross section and is provided with a longitudinally extending bottom groove arranged on the forward side of the casing to facilitate stretching of the casing.

* * * * *